(12) United States Patent
Gacoin et al.

(10) Patent No.: US 9,709,823 B2
(45) Date of Patent: Jul. 18, 2017

(54) METHOD FOR TRANSFORMING A PROGRESSIVE OPHTHALMIC SURFACE

(71) Applicant: ESSILOR INTERNATIONAL (COMPAGNIE GENERALE D'OPTIQUE), Charenton le Pont (FR)

(72) Inventors: Eric Gacoin, Charenton le Pont (FR); Laurent Huprel, Charenton le Pont (FR); Jérome Moine, Charenton le Pont (FR); Jean-Marc Padiou, Charenton le Pont (FR)

(73) Assignee: ESSILOR INTERNATIONAL (COMPAGNIE GENERALE D'OPTIQUE), Charenton le Pont (FR)

( * ) Notice: Subject to any disclaimer, the term of this patent is extended or adjusted under 35 U.S.C. 154(b) by 104 days.

(21) Appl. No.: 14/365,985

(22) PCT Filed: Dec. 12, 2012

(86) PCT No.: PCT/EP2012/075236
§ 371 (c)(1),
(2) Date: Jun. 16, 2014

(87) PCT Pub. No.: WO2013/087696
PCT Pub. Date: Jun. 20, 2013

(65) Prior Publication Data
US 2014/0307223 A1    Oct. 16, 2014

(30) Foreign Application Priority Data
Dec. 15, 2011   (FR) ...................... 11 61702

(51) Int. Cl.
*B24B 13/00* (2006.01)
*B24B 13/06* (2006.01)
*G02C 7/06* (2006.01)

(52) U.S. Cl.
CPC .............. *G02C 7/063* (2013.01); *B24B 13/00* (2013.01); *B24B 13/06* (2013.01)

(58) Field of Classification Search
CPC ........ G02C 7/063; G02C 7/061; G02C 7/024; B24B 13/00; B24B 13/06; G01M 11/0257;

(Continued)

(56) References Cited

U.S. PATENT DOCUMENTS 6,955,433 B1    10/2005  Wooley
2010/0250173 A1*  9/2010  Kozu ................ G01M 11/0257
                                           702/82

FOREIGN PATENT DOCUMENTS

DE    102005050205    4/2007
EP    1719584         11/2006
(Continued)

*Primary Examiner* — Scott J Sugarman
*Assistant Examiner* — Ibrahima Diedhiou
(74) *Attorney, Agent, or Firm* — Cozen O'Connor

(57) ABSTRACT

The present invention relates to a method for transforming an initial progressive ophthalmic surface which has to be manufactured by a manufacturing method, the transformation method comprising: a step of selecting a manufacturing method intended to be implemented, in which said manufacturing method introduces a reproducible surface defect, a step of selecting a predictive model of said reproducible surface defect, a step of selecting an initial progressive ophthalmic surface S intended to be manufactured, a step of determining (S1), during which there is determined, by means of said predictive model, a surface defect value D which would be introduced if the initial progressive ophthalmic surface S were produced by said manufacturing method, a transformation step (S2), during which said initial progressive ophthalmic surface S is transformed into a transformed progressive ophthalmic sur- (Continued)

face S* by compensating the defect value D determined during the step (S1), such that the subsequent manufacture of the transformed ophthalmic surface S* by said manufacturing method makes it possible to obtain a progressive ophthalmic surface which substantially conforms to the initial progressive ophthalmic surface S.

14 Claims, 3 Drawing Sheets

(58) Field of Classification Search
CPC .................. B23Q 15/22; G05B 19/40; G05B 2219/50063; G05B 2219/50057
USPC ...... 702/82, 35, 60, 185; 264/1.32; 356/124, 356/124.5, 127; 700/95, 97, 105, 193, 700/195; 703/1, 2, 6, 7; 706/904, 912, 706/924
See application file for complete search history.

(56) References Cited

FOREIGN PATENT DOCUMENTS

| | | |
|---|---|---|
| EP | 2189777 | 5/2010 |
| WO | WO 2007/017766 | 2/2007 |

* cited by examiner

METHOD FOR TRANSFORMING A PROGRESSIVE OPHTHALMIC SURFACE

RELATED APPLICATIONS

This is a U.S. National stage of International application No. PCT/EP2012/075236 filed on Dec. 12, 2012. This patent application claims the priority of European application No. 1161702 filed Dec. 15, 2011, the disclosure contents of which are hereby incorporated by reference.

FIELD OF THE INVENTION

The present invention relates to a method for transforming an initial progressive surface that has to be manufactured by a manufacturing method, as well as a method for manufacturing a progressive surface and a computer program product comprising a series of instructions which, when loaded on a computer, results in the execution by said computer of the steps of the methods according to the invention.

BACKGROUND OF THE INVENTION

Usually, an ophthalmic lens comprises a visual correction which is determined by a prescription established for the wearer of the lens.

Such a prescription notably indicates an optical power value and an astigmatism value suitable for correcting a wearer for far vision. These values are usually obtained by combining the anterior face of the lens with a posterior face which is generally spherical or sphero-toroidal. For a progressive lens, at least one of the two faces of the lens exhibits variations of sphere and of cylinder, from which result variations of optical power and of astigmatism between different directions of observation through the lens. In particular, the optical power difference between the two points dedicated to the far vision and to the near vision is called the optical addition, and its value must also correspond to the value prescribed for a presbyopic wearer.

Commonly, a progressive lens is manufactured in two successive steps. The first step consists in manufacturing a semi-finished lens, the anterior face of which may exhibit variations of sphere and of cylinder defined in relation to the optical performance levels desired for the finished lens. It is executed in a factory, for example by molding or injection. The semi-finished lenses are divided up into a plurality of articles, which may differ, notably, by the base, by the distribution of the spheres and cylinders of the anterior face, or by the addition. The base is the mean sphere at the point of the lens corresponding to the far vision. The vertical and horizontal distances between the near and far vision points, the respective widths of the areas of the lens corresponding to the near vision and to the far vision, the refractive index of the transparent material which constitutes the semi-finished lens, etc., may also differ from one article to another. Each combination of these characteristics corresponds to a different semi-finished lens article.

The second step consists in manufacturing the posterior face of the lens.

The posterior face of the lens may comprise variations of sphere and of cylinder such that the association of the two faces produces the desired optical performance levels.

The optical surfaces may, after manufacture, exhibit defects of form, in particular the optical surfaces exhibiting addition between two points of this surface may exhibit surface addition defects. Such a defect is generally due to a step of polishing the surface of the lens or of the mold, the polishing not uniformly removing the material from the surface to be polished thus deforming said surface.

The optical function of the final lens can be very sensitive to these surface defects. There is therefore a need for a method that makes it possible to reduce these surface defects.

A known method consists in producing the optical surface first, by measuring for example the surface addition defect, and remanufacturing the same optical surface to which the negative of the defect measured on the first manufactured surface will previously have been added. Thus, the second surface produced will be closer to the theoretical nominal surface. The drawback of such a method is that it entails manufacturing two surfaces to arrive at a satisfactory surface.

Another known method consists in producing a power adjustment at the far vision point. This adjustment consists of producing a certain number of lenses, by measuring the power defect at the far vision point, in other words the deviation between the power at the far vision point obtained relative to the far vision point of the nominal and providing a correction of this power by adding a spherical surface to the entire nominal surface before producing it. This method makes it possible to adjust a local value on the basis of a defect observed on a certain number of lenses or surfaces for which the semi-finished version used is common. However, this criterion is not entirely satisfactory; in practice, the polishing step does not uniformly impact on the entirety of the surface.

SUMMARY OF THE INVENTION

One object of the invention is to provide a method that makes it possible to enhance the progressive surface production precision which is simple to implement, suited to all types of progressive surfaces and that ensures a good efficiency.

The present invention relates in particular to the correction of surface defects introduced in a reproducible manner by a given manufacturing method.

Within the meaning of the present invention, a surface defect introduced by a manufacturing method is said to be reproducible if it is introduced in a robust and repeatable manner by the manufacturing method.

A surface defect is considered to be reproducible if, for a given manufacturing method, the independent production in N copies of one and the same given progressive surface generates a defect, said defect being identical qualitatively (nature of the defect and, where appropriate, its location on the progressive surface) and quantitatively for the N copies. A defect is considered to be identical quantitatively if the dispersion of the value of the defect over the N copies is less than or equal to the tolerance set for the quantity considered, the dispersion corresponding to the difference between the maximum value and the minimum value of the quantity over the N copies. Preferentially, N takes a value greater than 15.

A surface addition defect [respectively a surface addition defect between two reference points on a progressive surface; respectively a mean sphere defect; respectively a cylinder defect; respectively a polishing ring defect] associated with a given manufacturing method is considered to be reproducible if the independent production in N copies of one and the same given progressive ophthalmic surface by said manufacturing method generates a surface addition defect [respectively a surface addition defect between two reference points on a progressive surface; respectively a mean sphere defect; respectively a cylinder defect; respectively a polishing ring defect], the value of the surface addition defect [respectively of the surface addition defect between two reference points on a progressive surface; respectively of the mean sphere defect; respectively of the cylinder defect; respectively of the polishing ring defect] (deviation relative to the nominal value) being identical subject to a variation of +/−0.12 diopter, preferably +/−0.10 diopter. N is as defined above.

The reproducible nature of the defect makes it possible to use a predictive model, before any production of the surface, in order to anticipate and compensate for the defect associated with the manufacturing method.

One aspect of the invention is directed to a method for transforming an initial progressive surface that has to be manufactured by a manufacturing method, the transformation method comprising:
- a step of determining a surface defect during which the value D of a surface defect introduced in a reproducible manner by the manufacturing method is determined by means of a defect model previously established for said manufacturing method,
- a transformation step, during which the initial progressive surface is transformed by compensating the value D of the surface defect determined by means of the defect model such that, when the progressive surface is manufactured by means of said manufacturing method, the progressive surface manufactured substantially conforms to the initial progressive surface.

Advantageously, the method according to the invention implements a predictive model of a reproducible surface defect. In the method according to the invention, the predictive model of the reproducible surface defect has been previously established, i.e. established before the actual production of the progressive surface to be manufactured. In practice, the surface transformation method is implemented prior to the actual manufacture of the progressive surface.

Another aspect of the present invention is directed to a method for transforming an initial progressive ophthalmic surface which has to be manufactured by a manufacturing method, the transformation method comprising:
- a step of selecting a manufacturing method intended to be implemented, in which said manufacturing method introduces a reproducible surface defect,
- a step of selecting a predictive model of said reproducible surface defect,
- a step of selecting an initial progressive ophthalmic surface S intended to be manufactured,
- a step of determining (S1), during which there is determined, by means of said predictive model, a surface defect value D which would be introduced if the initial progressive ophthalmic surface S were produced by said manufacturing method,
- a transformation step (S2) during which said initial progressive ophthalmic surface S is transformed into a transformed progressive ophthalmic surface S* by compensating the defect value D determined during the step (S1), such that the subsequent manufacture of the transformed ophthalmic surface S* by said manufacturing method makes it possible to obtain a progressive ophthalmic surface which substantially conforms to the initial progressive ophthalmic surface S.

The step of selecting a manufacturing method generally comprises the choice of a manufacturing method, including the choice of the equipment, of the toolage, of the procedure, etc. The person skilled in the art will be able to choose a manufacturing method, notably on the basis of the characteristics of the progressive ophthalmic surface to be produced (geometry, material).

Typically, the surface defect may be introduced by a surfacing method, a polishing method, or by a combination of a surfacing and a polishing.

According to and embodiment of the invention, the manufacturing method introduces at least one reproducible surface defect. In the case where the manufacturing method introduces a plurality of reproducible surface defects, the method according to the invention may comprise the choice of a plurality of predictive models, i.e. one model per defect.

Advantageously, the method according to an embodiment of the invention makes it possible to enhance the initial progressive surface production precision without in any way requiring the prior production of a surface affected by an error. A method for transforming an initial progressive surface according to an embodiment of the invention may also comprise one or more of the optional characteristics below, considered individually in all possible combinations:
  the surface defect is a surface addition and/or sphere and/or cylinder defect and/or a polishing ring defect;
  the predictive surface defect model has been previously established by means of a method comprising:
    a selection step during which a set of progressive ophthalmic surfaces having different surface characteristics is selected,
    a manufacturing step, during which each of the progressive surfaces of the set of progressive surfaces are manufactured by means of said manufacturing method,
    a measurement step during which each of the manufactured surfaces is measured and at least one surface defect relative to the desired surfaces is quantified, the surface defect corresponding to the difference between the value of a characteristic measured on the manufactured surface and the desired value for this characteristic,
    an identification step during which characteristics of the progressive surfaces having an influence on the surface defect are identified,
    a determination step during which a predictive surface defect model for said manufacturing method linking the identified characteristics and the at least one defect introduced by the manufacturing method is determined,
  the manufacturing and measurement steps being repeated a plurality of times before the identification step;
  the surface defect is a surface addition defect which depends on the surface addition of the initial progressive surface, on the diameter of the progressive surface to be manufactured and on the progression length of the initial progressive surface.

Furthermore, according to aspect A of the invention, the surface defect is a surface addition defect between two reference points on the progressive surface, the initial progressive surface exhibits less than 0.25 diopter of cylinder at the reference points, and the transformation step comprises a derivation step during which the initial surface is derived so as to obtain an adjusted surface, observing: (Add transformed)=(Add initial)−(D), with
  (Add transformed) corresponding to the surface power addition between the far vision point and the near vision point of the transformed surface,
  (Add initial) corresponding to the surface power addition between the far vision point and the near vision point of the initial surface, and (D) corresponding to the surface addition defect introduced by the manufacturing method;

the transformed surface has substantially the same sphere and cylinder values at at least one of the two reference points as the initial surface.

Furthermore, according to aspect B of the invention:

the surface defect is a surface addition defect between two initial reference points chosen on the initial progressive surface and in which the transformation step comprises:

a step of selecting a generic progressive surface during which a generic progressive surface exhibiting less than 0.25 diopter of cylinder at at least two generic reference points as well as a surface addition between these same two reference points, and having, within an area of 50 mm diameter centered on the mid-point of the two generic reference points, a maximum cylinder less than or equal to 1.5 times the surface addition of this generic progressive surface is selected, a derivation step during which the generic progressive surface is derived so as to obtain a unitary addition adjustment surface having less than 0.1 diopter of mean sphere as an absolute value at one of the generic reference points and a surface addition of y diopter between the two generic reference points, with y being between 0.05 and 0.2 diopter, a step for multiplying the unitary addition adjustment surface during which the unitary addition adjustment surface is multiplied by a factor k defined by k=−D/y in order to obtain an addition adjustment surface, a summation step during which the initial progressive surface and the addition adjustment surface are summed point by point on the altitudes of the two surfaces in order to obtain an addition-adjusted surface, or the surface defect is a surface addition defect and the transformation step comprises:

a step for selecting a generic progressive surface during which a generic progressive surface exhibiting less than 0.25 diopter of cylinder at at least two generic reference points as well as a surface addition between these same two reference points, and having, within an area of 50 mm diameter centered on the mid-point of the two generic reference points, a maximum cylinder less than or equal to 1.5 times the surface addition of this generic progressive surface is selected, a derivation step during which the generic progressive surface is derived so as to obtain an addition adjustment surface having less than 0.1 diopter of mean sphere as an absolute value at one of the generic reference points and a surface addition of y diopter between the two generic reference points, y being substantially equal to the opposite of the addition defect value, a summation step during which the initial progressive surface and the addition adjustment surface are summed point by point on the altitudes of the two surfaces in order to obtain an addition-adjusted surface.

According to an aspect of the invention, the surface defect is a surface addition defect and the transformation step comprises:

the steps according to aspect A of the invention when the initial progressive surface exhibits less than 0.25 diopter of cylinder at at least two initial reference points, and the steps according to aspect B of the invention when the initial progressive surface exhibits 0.25 diopter or more of cylinder at at least two initial reference points.

A method for transforming an initial progressive surface according to an embodiment of the invention may also comprise one or more of the optional characteristics below, considered individually in all possible combinations:

the generic reference points are situated respectively at less than 3 mm from the initial reference points, preferably respectively at less than 1 mm from the initial reference points;

the reference points are the near and far vision points;

the progressive surface is a surface of a progressive lens or a surface of a mold intended to manufacture a semi-finished lens.

Another aspect of the invention relates to a method for obtaining a progressive surface of a progressive ophthalmic lens comprising the following steps:

transformation of the progressive surface to be manufactured according to a method according to an embodiment of the invention, production of the transformed progressive ophthalmic surface S* by means of said manufacturing method.

According to one aspect of the invention, said production comprises the steps of:

surfacing the surface of the ophthalmic lens according to the transformed progressive surface, and polishing the surface of the lens obtained from the preceding step.

The ophthalmic lens may be a lens of a pair of glasses, a finished or semi-finished lens, a contact lens or an intraocular lens. The progressive surface may be a front face or a rear face.

Another aspect of the invention is a computer program product comprising a series of instructions which, when loaded in a computer, results in the execution by said computer of the steps of a method according to an embodiment of the invention.

BRIEF DESCRIPTION OF THE DRAWINGS

The invention will be better understood on reading the following description, given solely as an example and with reference to the appended drawings in which.

DETAILED DESCRIPTION OF THE DRAWINGS

Within the meaning of the invention, the expression "method for manufacturing a progressive surface" will be understood to mean a method comprising at least a machining step and a polishing step.

Within the meaning of the invention, the expression "progression length" will be understood to mean the distance which is measured vertically on the complex surface of the lens between the mounting cross and a point of the meridian line for which the mean sphere presents a deviation equal to 85% of the surface addition relative to the far vision reference point.

Within the meaning of the invention, the expression "surface addition between two points of a surface" will be understood to mean the mean sphere variation between these two points. The two points may be the near vision point (NV) and the far vision point (FV).

In a progressive ophthalmic lens, the near vision point is horizontally offset relative to a vertical straight line which passes through the far vision point, when the lens is in a position of use by a wearer thereof. This offset, which is toward the nasal side of the lens, is commonly called inset.

Figure 1:
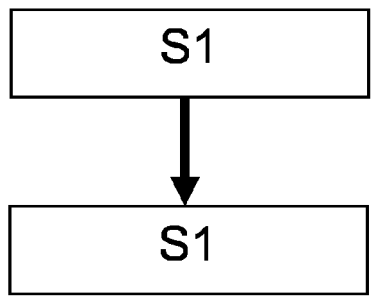
FIG. 1 illustrates the steps of the transformation method according to an embodiment of the invention.

As represented in FIG. 1, the method for transforming an initial progressive surface that has to be manufactured by a manufacturing method comprises:
 a step of determining a surface defect S1, and
 a transformation step S2.

According to one embodiment, the method according to the invention comprises, prior to the step of determining a surface defect, a methodical analysis of the surface defects, for example of the surface addition defects generated in order to identify the influencing characteristics thereof.

This makes it possible to establish a defect model and therefore to determine the defect value as a function of the value of the characteristics of the progressive surface to be manufactured. Then, during the determination step, the value of the surface defect can be determined by means of the previously established model.

And finally, during the transformation step, a surface component is added to the theoretical nominal surface, said component containing, for example, a surface addition with a value opposite to the foreseen (predicted) defect. There is thus obtained a transformed surface which, once produced given the defect generated by the method, will have a surface addition closer to the nominal value.

Advantageously, the method according to the invention makes it possible to foresee (anticipate) the value of the surface defect, for example of the surface addition defect, even before the manufacture of the surface, based on known parameter values of the surface to be manufactured.

Furthermore, the method according to the invention makes it possible to modify, in a simple manner, the surface before its manufacture and with a moderate computation power.

Figure 2:
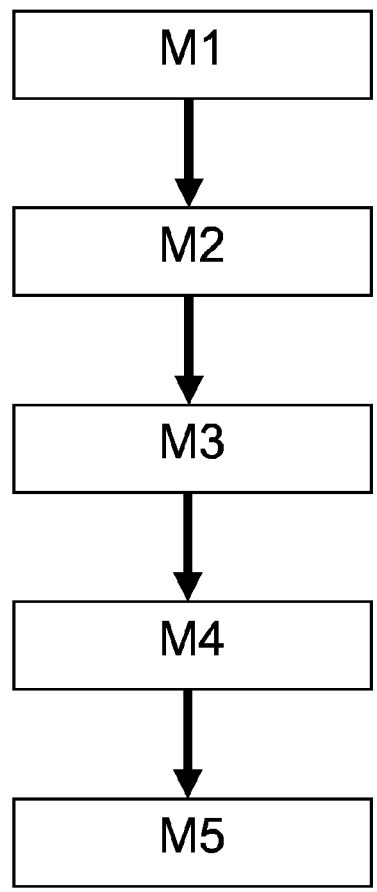
FIG. 2 illustrates the steps of a method making it possible to establish a defect model.

As illustrated in FIG. 2, prior to the step of determining a surface defect S1, the method according to the invention may comprise a modeling method consisting in establishing a defect model. The object of this modeling method is to establish a predictive model that makes it possible, based on the characteristics of an initial surface intended to be manufactured by a method, to provide the value D of a surface defect.

The value D of the surface defect being the difference between the value of a surface parameter that the surface would exhibit if it were manufactured by said method and the value desired for said surface parameter. For example, the surface defect may be a surface addition defect; the surface addition being defined between two reference points on the surface, for example the near and far vision points. The surface addition defect then corresponding to the difference between, on the one hand, the surface addition value that the progressive surface would exhibit if it were manufactured by the method and, on the other hand, the desired surface addition value for the progressive surface.

According to one embodiment of the invention, the method for modeling a surface defect introduced by a manufacturing method comprises:
 a selection step M1,
 a manufacturing step M2,
 a measurement step M3,
 an identification step M4, and
 a determination step M5,
the manufacturing and measurement steps being repeated a plurality of times before the identification step.

During the selection step M1, a set of progressive surfaces having different surface characteristics are selected. The number of progressive surfaces in this set depends on the number of surface characteristics of interest. Advantageously, efforts will be made to minimize the number of surfaces of this set. Typically, the surface set comprises fewer than 100, preferably fewer than 80, preferably fewer than 60 surfaces that are different from one another. The expression "different surfaces" should be understood to mean surfaces that have at least one surface characteristic differing from one to the other.

In practice, prior to the selection of a surface set, a set of surface characteristics likely to have an influence on the value of the surface defect to be modeled is selected.

The possible surface characteristics that can be selected include:
 the curvature of the progressive surface at at least one point,
 the cylinder of the progressive surface at at least one point,
 the axis of the cylinder at at least one point of the progressive surface,
 the surface addition of the progressive surface between two reference points on this progressive surface, for example between the far vision point and the near vision point,
 the diameter of the progressive surface to be machined,
 the progressive length of the progressive surface, or even
 the inset between two reference points of this progressive surface, for example between the near vision point and the far vision point of the surface.

In order to facilitate the analysis of the results, it is desirable to select the surface characteristics and their value by having previously established a test plan using a statistical method, for example by using the design of experiments method.

Thus, the step M1 makes it possible to select a set of surfaces exhibiting various combinations of values for the surface characteristics, notably the surface characteristics mentioned above.

Following the selection step M1, the modeling method according to the invention comprises a manufacturing step M2 during which each of the progressive surfaces of the set of selected progressive surfaces are manufactured by using the manufacturing method for which the aim is to establish a model associated with a surface defect.

Typically, the progressive surfaces are produced by machining one of the faces of a semi-finished lens or by machining one of the faces of a mold for ophthalmic lens.

On completion of the manufacturing step M2, there is a set of progressive surfaces having different surface characteristics.

Each progressive surface manufactured during the manufacturing step M2 is measured during the measurement step M3. During the measurement step M3, the surface defect that is to be modeled is quantified. The surface defect for a given manufactured surface is defined by the difference between the value of a surface parameter measured on this progressive surface and the desired value for this surface parameter.

According to one embodiment of the invention, the manufacturing M2 and measurement M3 steps are repeated a plurality of times. The defect values can thus be averaged between the different surfaces manufactured for one and the same desired initial surface.

Advantageously, this makes it possible to determine an average surface defect for each of the surfaces of the chosen set and to take account of the dispersion of the method.

During the identification step M4, the influence of each of the surface characteristics selected during the selection step M1, on the surface defect to be modeled is determined. For example, it is possible, by using a statistical method of the design of experiments type, to determine the surface characteristics that have an influence on the surface defect to be modeled.

Following the identification step M4, a surface defect model is established for the manufacturing method during the determination step M5. The surface defect model makes it possible to link, for a given manufacturing method, the surface characteristics of the surface to be manufactured and the surface defect to be modeled.

One example that can be cited as surface defect is a surface addition defect between two reference points. By convention, it is possible to select the near vision and far vision points as reference points.

In the context of progressive surfaces of molds intended for the manufacture of semi-finished lenses, the inventors have established a surface addition defect model between the near vision point and the far vision point of type:

$$D=A*(\text{Add initial})+B, \text{ with}$$

D being the surface addition defect value,
(Add initial) being the value of the desired surface addition between two reference points, and
A and B being constants whose value depends on the manufacturing method used and on the reference points.

In the context of progressive surfaces of ophthalmic progressive lenses, the inventors have established a first surface addition defect model between the near vision point and the far vision point of type:

$$D=A*(\text{Add initial})+B+C*(\text{dia})+D*(LP) \text{ with}$$

D being the surface addition defect value,
(Add initial) being the value of the desired surface addition between two reference points,
(dia) being the diameter of the progressive surface to be manufactured,
(LP) being the progression length of the progressive surface to be manufactured, and
A, B, C and D being constants whose value depends on the manufacturing method used and on the reference points.

In the context of progressive surfaces of ophthalmic progressive lenses, the inventors have established a second surface addition defect model between the near vision point and the far vision point of type:

$$D=A*(\text{Addini})+B+C*(\text{dia})+D*(LP)+E*(\text{dia})^2+ F*(LP)^2+G*(\text{Addini})^2+H*(\text{dia})*(LP)+I*(\text{dia})* (\text{Addini})+J*(LP)*(\text{Addini})$$

with
D being the surface addition defect value,
(Addini) being the value of the desired surface addition between two reference points,
(dia) being the diameter of the progressive surface to be manufactured,
(LP) being the progression length of the progressive surface to be manufactured, and A, B, C, D, E, F, G, H, I and J being constants whose value depends on the manufacturing method used and on the reference points.

Advantageously, the defect model established by the modeling method according to the invention makes it possible, during the determination step S1, to determine the value of a surface defect which would be introduced by the manufacturing method modeled during surface manufacture.

During the transformation step S2, the initial progressive surface is transformed by compensating the value D of the surface defect determined during the determination step S1. The transformation of the initial progressive surface is produced in such a way that the manufactured progressive surface conforms to the initial progressive surface.

The expression "a manufactured progressive surface that conforms to the initial progressive surface" should be understood to mean a progressive surface manufactured by the manufacturing method that exhibits substantially the same surface characteristics as the initial progressive surface and for which the value of the surface defect is less, as an absolute value, than the value D of the surface defect determined during the determination step S1; preferably, the value of the surface defect is less than or equal, as an absolute value, to the tolerance set. Typically, with respect to an optical defect (surface addition defect, mean sphere defect, cylinder defect, polishing ring defect), the surface is said to substantially conform if the absolute value of the actual defect on the surface obtained is less than or equal to 0.12 diopter, preferably 0.10 diopter.

As will appear clearly to the person skilled in the art, the progressive surface manufactured by means of the method according to the invention corresponds to the initial progressive surface within the limits of the accuracy of the defect model and the repeatability of the manufacturing method.

According to one embodiment of the invention, the surface defect is a surface addition defect between two reference points on the progressive surface and the initial progressive surface exhibits less than 0.25 diopter of cylinder at the reference points.

The transformation step S2 comprises a derivation step during which the initial surface is derived so as to obtain an adjusted surface, observing: (Add transformed)=(Add initial)−D, with
(Add transformed) corresponding to the surface power addition between the far vision point and the near vision point of the transformed surface,
(Add initial) corresponding to the surface power addition between the far vision point and the near vision point of the initial surface, and
D corresponding to the surface addition defect introduced by the manufacturing method.

The operation for derivation of a surface within the meaning of the invention is defined in the document U.S. Pat. No. 6,955,433, the content of which is incorporated by reference. In particular, an operation for derivation of a surface comprises the following steps:
computation of the sphere and cylinder distribution of the initial surface,
transformation of the sphere and cylinder distribution, then
performing a double integration of the transformed sphere and cylinder distribution so as to obtain the derived surface.

Figure 3:
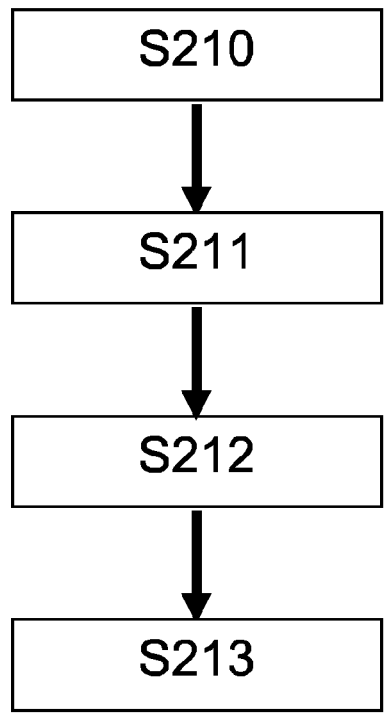
FIG. 3 illustrates steps of the transformation step according to one embodiment.

According to one embodiment of the invention illustrated in FIG. 3 and according to which the surface defect is a surface addition defect between two initial reference points on the progressive surface, the transformation step S2 comprises:
- a step of selection of a generic progressive surface S210,
- a derivation step S211,
- a step of multiplication of the unitary surface addition adjustment surface S212, and
- a summation step S213.

During the step of selection of a generic progressive surface, a generic progressive surface is selected. Within the meaning of this embodiment, a generic surface should be understood to be a surface exhibiting less than 0.25 diopter of cylinder at at least two generic reference points as well as a surface addition between these same two reference points, and having a maximum cylinder less than or equal to 1.5 times its surface addition in the area of 50 mm diameter centered on the mid-point of the two reference points.

During the derivation step, the generic progressive surface is derived so as to obtain a unitary addition adjustment surface, the unitary addition adjustment surface being a surface that has less than 0.1 diopter of mean sphere as an absolute value, for example less than 0.05 diopter or even substantially zero diopter, at one of the generic reference points and a surface addition of y diopter between the two generic reference points, with y being between 0.05 and 0.2 diopter, for example substantially equal to 0.1 diopter.

The initial reference points may correspond to the near vision and far vision points. In this case, the unitary addition adjustment surface exhibits less than 0.1 diopter of mean sphere as an absolute value, for example less than 0.05 diopter or even substantially zero diopter, at the far vision point and a surface addition of y diopter between the far vision points and the near vision points, with y being between 0.05 and 0.2 diopter, for example substantially equal to 0.1 diopter.

Following the derivation step, the unitary addition adjustment surface is multiplied by a factor k defined by $k=-D/y$ in order to obtain an addition adjustment surface, during the multiplication step.

Finally, the initial progressive surface and the addition adjustment surface are summed point by point on the altitudes of the two surfaces in order to obtain an addition-adjusted surface. The addition-adjusted surface is such that, during its manufacture by the manufacturing method, the progressive surface obtained corresponds to the initial progressive surface.

According to one embodiment of the invention, the initial progressive surface is the surface of an ophthalmic lens to be manufactured. The ophthalmic lens to be manufactured exhibits a given optical function. The generic progressive surface may be a surface which, combined with a spherical surface, makes it possible to obtain the optical function of the ophthalmic lens to be manufactured. It is possible to determine this generic progressive surface, for example by means of the method described in the application WO 2007/017766.

Figure 4:
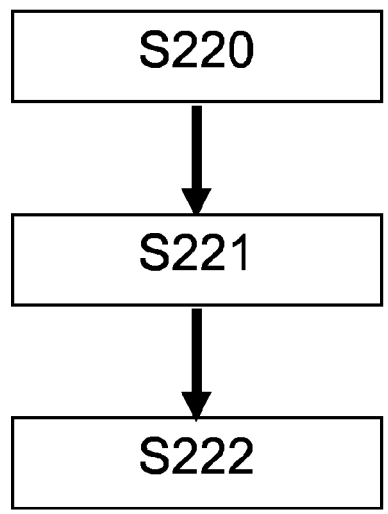
FIG. 4 illustrates steps of the transformation step according to an embodiment different from that of FIG. 3.

According to one embodiment of the invention illustrated in FIG. 4 and according to which the surface defect is a surface addition defect between two initial reference points on the progressive surface, the transformation step S2 comprises:
- a step of selection of a generic progressive surface 5220,
- a derivation step S221,
- a summation step S222.

During the step of selection of a generic progressive surface, a generic progressive surface is selected. Within the meaning of this embodiment, a generic surface should be understood to be a surface exhibiting less than 0.25 diopter of cylinder at at least two generic reference points as well as a surface addition between these same two reference points, and having a maximum cylinder less than or equal to 1.5 times its surface addition in the area of 50 mm diameter centered on the mid-point of the two reference points.

During the derivation step, the generic progressive surface is derived so as to obtain an addition adjustment surface. The addition adjustment surface being a surface that has less than 0.1 diopter of mean sphere as an absolute value, for example less than 0.05 diopter or even substantially zero diopter, at one of the generic reference points and a surface addition of y diopter between the two generic reference points, y being substantially equal to the opposite of the value of the addition defect.

The initial reference points may correspond to the near vision and far vision points. In this case, the addition adjustment surface exhibits less than 0.1 diopter of mean sphere as an absolute value, for example less than 0.05 diopter or even substantially zero diopter, at the far vision point and a surface addition of y diopter between the far vision points and near vision points, with y being substantially equal to the opposite of the value of the addition defect.

Finally, the initial progressive surface and the addition adjustment surface are summed point by point on the altitudes of the two surfaces in order to obtain an addition-adjusted surface. The addition-adjusted surface is such that, during its manufacture by the manufacturing method, the progressive surface obtained corresponds to the initial progressive surface.

According to one embodiment of the invention, the method according to the invention may comprise a first test step S10, which, according to the value of the cylinder at at least two points of the initial surface, makes it possible to decide to apply the transformation step according to one or other of the embodiments described previously.

For example, if the initial progressive surface exhibits less than 0.25 diopter of cylinder at at least two initial reference points then the transformation method applies the transformation step according to FIG. 1 and if the initial progressive surface exhibits 0.25 diopter or more of cylinder at at least two initial reference points then the transformation method applies the transformation step according to FIG. 3 or 4.

The method according to the invention may also comprise a test step S20 which makes it possible to determine, for example according to the available computation power or the architecture of the information system, whether the transformation method applies the transformation step according to FIG. 3 or 4.

Figure 5:
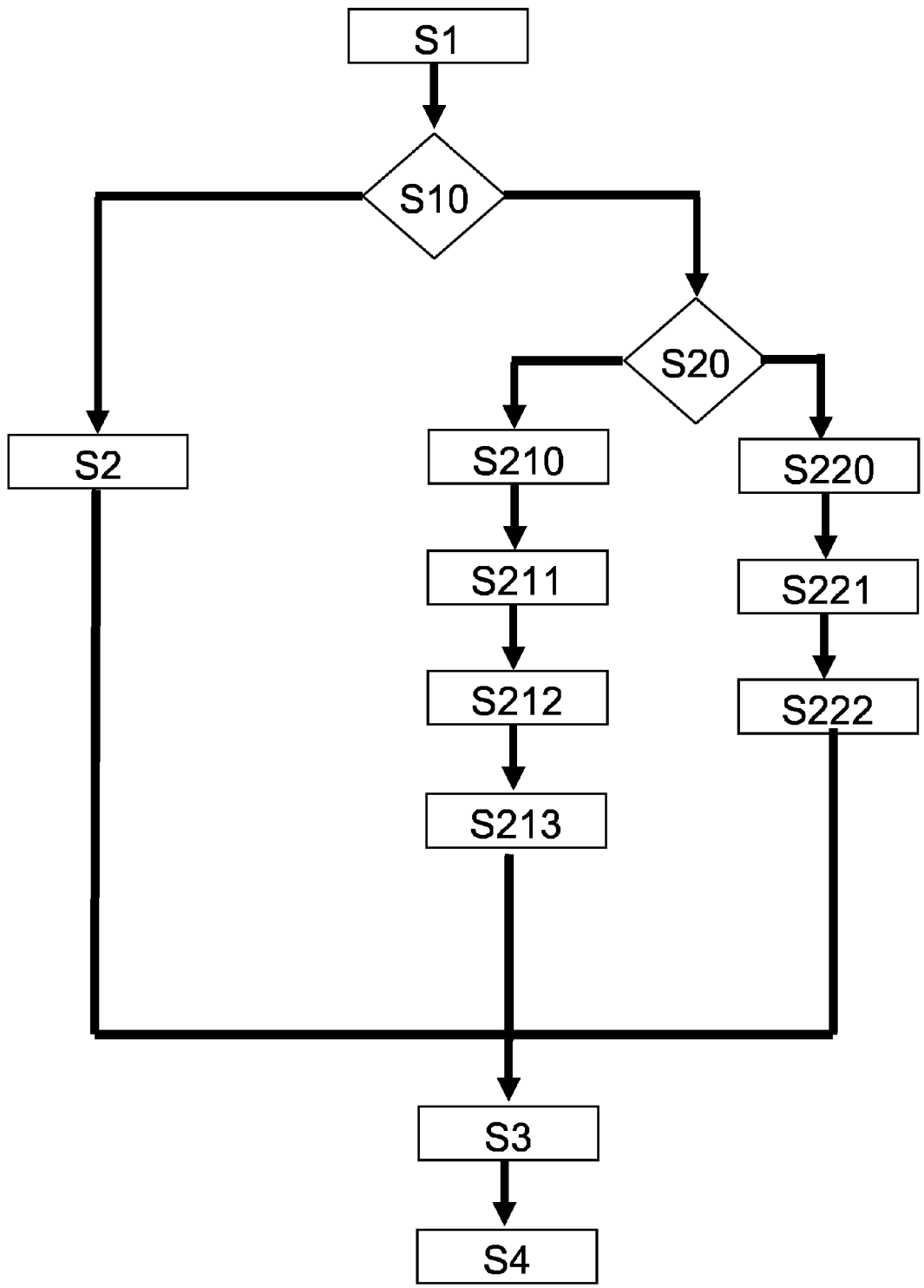
FIG. 5 illustrates the steps of a manufacturing method according to an embodiment of the invention.

The invention also relates to a method for manufacturing a progressive surface as described in FIG. 5.

As illustrated in FIG. 5, the manufacturing method according to the invention comprises:
- a step of determining a surface defect S1,
- a step of transforming S2 the progressive surface to be manufactured according to one of the embodiments of the invention,
- a step of surfacing S3 the surface of the ophthalmic lens according to the transformed progressive surface, and
- a step of polishing S4 the surface of the lens.

Finally, it is understood that the invention can be reproduced in forms different from those of the embodiments which have been described in detail. The person skilled in the art will have understood, according to the present description, that the method according to the invention can be used for surface defect types other than those described in detail.

The invention is not limited to the embodiments which have been described and which should be interpreted in a nonlimiting manner and encompassing all equivalent embodiments.

The invention claimed is:

1. A method for transforming an initial progressive ophthalmic surface which has to be manufactured by a manufacturing method, the transformation method being implemented prior to an actual manufacture of the progressive ophthalmic surface and comprising:
   a step of selecting a manufacturing method intended to be implemented on the basis of characteristics of the progressive ophthalmic surface to be manufactured after the transformation method, in which said manufacturing method introduces a reproducible surface defect;
   a step of selecting a predictive model of said reproducible surface defect, the predictive model providing a value D of said reproducible surface defect based on characteristics of the initial progressive ophthalmic surface intended to be manufactured;
   a step of selecting an initial progressive ophthalmic surface S intended to be manufactured,
   a step of determining, during which there is determined, by means of said predictive model, a surface defect value D as a function of a value of said characteristics of the initial progressive ophthalmic surface to be manufactured, said surface defect value D being the difference between a value of a surface parameter that the progressive ophthalmic surface would exhibit if it were manufactured by said manufacturing method and a desired value for said surface parameter; and
   a transformation step during which said initial progressive ophthalmic surface S is transformed into a transformed progressive ophthalmic surface S* by compensating the surface defect value D determined during the determination step, such that the transformed progressive ophthalmic surface S* subsequently manufactured by said manufacturing method conforms to the initial progressive ophthalmic surface S and exhibits a value of the surface defect which is less than, as an absolute value, to said surface defect value D.

2. The method of claim 1, wherein the surface defect is a surface addition and/or mean sphere and/or cylinder defect and/or a polishing ring defect.

3. The method of claim 1, wherein the predictive surface defect model has been previously established by means of a method comprising:
   a selection step during which a set of progressive ophthalmic surfaces having different surface characteristics is selected,
   a manufacturing step, during which each of the progressive surfaces of the set of progressive surfaces are manufactured by means of said manufacturing method;
   a measurement step during which each of the manufactured surfaces is measured and at least one surface defect relative to the desired surfaces is quantified, the surface defect corresponding to the difference between the value of a characteristic measured on the manufactured surface and the desired value for this characteristic;
   an identification step during which characteristics of the progressive surfaces having an influence on the surface defect are identified;
   a determination step during which a predictive surface defect model for said manufacturing method linking the identified characteristics and the at least one defect introduced by the manufacturing method is determined; and
   the manufacturing and measurement steps being repeated a plurality of times before the identification step.

4. The method of claim 1, wherein the surface defect is a surface addition defect which depends on the surface addition of the initial progressive ophthalmic surface, on the diameter of the progressive surface to be manufactured and on the progression length of the initial progressive ophthalmic surface.

5. The method of claim 1, wherein the surface defect is a surface addition defect between two reference points on the progressive surface, the initial progressive ophthalmic surface exhibits less than 0.25 diopter of cylinder at the reference points, and wherein the transformation step comprises a derivation step during which the initial progressive ophthalmic surface is derived so as to obtain an adjusted surface, observing: (Add transformed)=(Add initial)−(D), with
   (Add transformed) corresponding to the surface power addition between the far vision point and the near vision point of the transformed progressive ophthalmic surface,
   (Add initial) corresponding to the surface power addition between the far vision point and the near vision point of the initial progressive ophthalmic surface, and
   (D) corresponding to the surface addition defect introduced by the manufacturing method.

6. The method of claim 5, wherein the transformed progressive ophthalmic surface has the same sphere and cylinder values at at least one of the two reference points as the initial progressive ophthalmic surface.

7. The method of claim 1, wherein the surface defect is a surface addition defect between two initial reference points chosen on the initial progressive ophthalmic surface and wherein the transformation step comprises:
   a step of selecting a generic progressive surface during which a generic progressive surface exhibiting less than 0.25 diopter of cylinder at at least two generic reference points as well as a surface addition between these same two reference points, and having a maximum cylinder less than or equal to 1.5 times its surface addition in the area of 50 mm diameter centered on the mid-point of the two reference points is selected;
   a derivation step during which the generic progressive surface is derived so as to obtain a unitary surface addition adjustment surface having less than 0.1 diopter of mean sphere as an absolute value at one of the generic reference points and a surface addition of y diopter between the two generic reference points, with y being between 0.05 and 0.2 diopter;
   a step of multiplying the unitary addition adjustment surface during which the unitary addition adjustment surface is multiplied by a factor k defined by k=−D/y in order to obtain an addition adjustment surface;
   a summation step during which the initial progressive ophthalmic surface and the addition adjustment surface are summed point by point on the altitudes of the two surfaces in order to obtain an addition-adjusted surface.

8. The method of claim 1, wherein the surface defect is a surface addition defect and wherein the transformation step comprises:
   a step of selecting a generic progressive surface during which a generic progressive surface exhibiting less than 0.25 diopter of cylinder at at least two generic reference points as well as a surface addition between these same two reference points, and having a maximum cylinder less than or equal to 1.5 times its surface addition in the area of 50 mm diameter centered on the mid-point of the two reference points is selected;

a derivation step during which the generic progressive surface is derived so as to obtain an addition adjustment surface having less than 0.1 diopter of mean sphere as an absolute value at one of the generic reference points and a surface addition of y diopter between the two generic reference points, y being substantially equal to the opposite of the addition defect value; and a summation step during which the initial progressive ophthalmic surface and the addition adjustment surface are summed point by point on the altitudes of the two surfaces in order to obtain an addition-adjusted surface.

9. The method of claim 7, wherein the generic reference points are respectively less than 3 mm remote from the initial reference points.

10. The method of claim 1, wherein the reference points are the near and far vision points.

11. The method of claim 1, wherein the initial progressive ophthalmic surface is a surface of a progressive lens or a surface of a mold intended to manufacture a semi-finished lens.

12. A method for obtaining a progressive surface of a progressive ophthalmic lens comprising the following steps:
   transformation of the progressive surface to be manufactured of claim 1, and
   production of the transformed progressive ophthalmic surface S* by means of said manufacturing method.

13. The obtaining method of claim 12, wherein said production comprises the steps of:
   surfacing the surface of the ophthalmic lens according to the transformed progressive ophthalmic surface; and
   polishing the surface of the lens obtained from the step (S3).

14. A system for transforming in initial progressive ophthalmic surface which has to be manufactured by a manufacturing method, the system comprising a computer program product comprising a series of instructions, wherein said instructions, when loaded in a computer, are capable of implementing the steps of the method of claim 1.

* * * * *